(12) United States Patent
Michelini et al.

(10) Patent No.: US 10,302,109 B2
(45) Date of Patent: May 28, 2019

(54) PANEL FASTENING SYSTEM

(71) Applicant: INTERNATIONAL AUTOMOTIVE COMPONENTS GROUP NORTH AMERICA, INC., Southfield, MI (US)

(72) Inventors: Paul Francis Michelini, Plymouth, MI (US); Stanley Curtis Dobson, Northville, MI (US); Aaron Michael Delong, Oxford, MI (US); Gaspar Michael Badalamenti, Brownstown, MI (US)

(73) Assignee: International Automotive Components Group North America, Inc., Southfield, MI (US)

( * ) Notice: Subject to any disclaimer, the term of this patent is extended or adjusted under 35 U.S.C. 154(b) by 127 days.

(21) Appl. No.: 15/461,850

(22) Filed: Mar. 17, 2017

(65) Prior Publication Data

US 2017/0268550 A1   Sep. 21, 2017

Related U.S. Application Data

(60) Provisional application No. 62/310,205, filed on Mar. 18, 2016.

(51) Int. Cl.
*B60R 13/02* (2006.01)
*F16B 5/12* (2006.01)
(Continued)

(52) U.S. Cl.
CPC ............... *F16B 5/123* (2013.01); *A01K 1/00* (2013.01); *A47G 33/04* (2013.01); *B60R 13/00* (2013.01);
(Continued)

(58) Field of Classification Search
CPC ...... F16B 5/123; F16B 21/075; F16B 21/071; F16B 13/02; F16B 5/0657; F16B 5/0664; A01K 1/00; A47G 33/04; B60R 13/00
See application file for complete search history.

(56) References Cited

U.S. PATENT DOCUMENTS 4,550,230 A   10/1985   Johnson
5,195,793 A *   3/1993   Maki ...................... F16B 5/128
                                                           24/297

(Continued)

OTHER PUBLICATIONS

European Search Report dated Jun. 6, 2017 issued in related European Patent Application No. EP17 16 1594.1, (9 pgs).

(Continued)

*Primary Examiner* — Jason W San
(74) *Attorney, Agent, or Firm* — Grossman, Tucker, Perreault & Pfleger, PLLC

(57) ABSTRACT

A fastening system comprising a second fastener fastened to a first fastener; the first fastener comprising a hollow housing having a side-wall and a top-wall; a first aperture formed in the side-wall and in the top-wall of the hollow housing, the first aperture configured for entry of the second fastener during fastening of the second fastener and first fastener; a second aperture formed in the side-wall of the hollow housing; a beam formed in the side-wall between the first aperture and the second aperture, the beam attached at opposing ends to the side-wall; the beam blocks the first aperture to inhibit separation of the second fastener from the first fastener through the first aperture; and the beam is configured to be deformed during fastening of the second fastener to the first fastener.

17 Claims, 3 Drawing Sheets

(51) Int. Cl.
*A01K 1/00* (2006.01)
*A47G 33/04* (2006.01)
*B60R 13/00* (2006.01)
*F16B 13/02* (2006.01)
*F16B 5/06* (2006.01)
*F16B 21/07* (2006.01)

(52) U.S. Cl.
CPC ........ *B60R 13/0206* (2013.01); *F16B 5/0657* (2013.01); *F16B 5/0664* (2013.01); *F16B 13/02* (2013.01); *F16B 21/071* (2013.01); *F16B 21/075* (2013.01)

(56) References Cited

U.S. PATENT DOCUMENTS

| | | | | |
|---|---|---|---|---|
| 5,651,634 | A * | 7/1997 | Kraus | F16B 5/0628 403/331 |
| 6,565,116 | B1 | 5/2003 | Tajima et al. | |
| 6,594,870 | B1 | 7/2003 | Lambrecht et al. | |
| 6,715,185 | B2 * | 4/2004 | Angellotti | F16B 5/065 24/297 |
| 6,796,760 | B1 | 9/2004 | Tanner | |
| 7,152,281 | B2 * | 12/2006 | Scroggie | B60R 13/0206 24/297 |
| 7,165,371 | B2 * | 1/2007 | Yoyasu | B60R 13/04 24/292 |
| 7,178,855 | B2 | 2/2007 | Catron et al. | |
| 7,189,043 | B2 | 3/2007 | Benoit et al. | |
| 7,954,205 | B2 * | 6/2011 | Xueyong | B60R 13/0206 24/289 |
| 8,656,563 | B2 * | 2/2014 | Hiramatsu | F16B 41/002 24/297 |
| 8,979,156 | B2 | 3/2015 | Mally | |
| 9,022,447 | B2 * | 5/2015 | Schidan | B60R 13/0243 296/1.08 |
| 9,216,703 | B2 * | 12/2015 | Lauxen | B60R 13/0206 |
| 9,739,298 | B2 * | 8/2017 | Fellows | F16B 17/00 |
| 9,956,925 | B2 * | 5/2018 | Akazawa | F16B 5/0657 |
| 10,017,130 | B2 * | 7/2018 | Knieper | B60R 13/0206 |
| 2004/0083583 | A1 * | 5/2004 | Bradley | F16B 5/0657 24/297 |
| 2007/0107174 | A1 | 5/2007 | Bordas | |
| 2008/0260454 | A1 * | 10/2008 | Girodo | B60R 13/0206 403/11 |
| 2009/0019674 | A1 | 1/2009 | Sato et al. | |
| 2009/0188086 | A1 * | 7/2009 | Okada | B60R 13/0206 24/297 |
| 2009/0249587 | A1 * | 10/2009 | Donahue-Yan | B60R 13/0206 24/297 |
| 2011/0119875 | A1 * | 5/2011 | Iwasaki | B60J 5/0468 24/458 |
| 2013/0229024 | A1 * | 9/2013 | Schidan | B60R 13/0206 296/1.08 |
| 2014/0191526 | A1 * | 7/2014 | Lauxen | B60R 13/0206 296/1.08 |
| 2014/0196259 | A1 * | 7/2014 | Kuhm | B60R 13/0206 24/289 |
| 2015/0337882 | A1 * | 11/2015 | Iwahara | F16B 5/0657 24/489 |
| 2016/0290380 | A1 * | 10/2016 | Fellows | F16B 17/00 |
| 2016/0368433 | A1 * | 12/2016 | Vega Velazquez | B60R 13/0206 |
| 2017/0210305 | A1 * | 7/2017 | Shen | B60R 13/0212 |

OTHER PUBLICATIONS

European Communication of Intent to Grant, dated Aug. 7, 2018 issued in related European Patent Application No. EP17 16 1594.1 (27 pgs).

* cited by examiner

PANEL FASTENING SYSTEM

CROSS-REFERENCE TO RELATED APPLICATIONS

This application claims the benefit of U.S. Provisional Patent Application Ser. No. 62/310,205, filed on Mar. 18, 2016, which is fully incorporated herein by reference.

FIELD

The present disclosure relates to a panel fastening system to fasten a panel to a panel support structure, the fastening system comprising a first fastener and a second fastener which mate with one another. The first fastener includes a retention member that assists in retaining the second fastener to the first fastener.

BACKGROUND

Various types of fasteners have been reported for coupling a trim panel to a support member. This includes, e.g., U.S. Pat. No. 6,594,870 to Lambrecht et al., entitled "Panel Fastener", which is directed at a fastener for coupling a trim panel to a support member that includes a mounting grommet with a funnel-shaped receiver communicating with an aperture for receiving one end of a fastener pin having a plurality of spaced annular ratcheting grooves formed thereon.

U.S. Pat. No. 6,796,760 to Tanner, entitled "Retention Structure For A Fastener", describes a retainer housing for retaining an object such as a fastener, used to secure trim panels to an inner vehicle panel.

U.S. Pat. No. 7,178,855 to Catron et al., entitled "Internal Doghouse Fastener With Retaining Feature", describes an automotive door panel fastener including a substrate and doghouse structure molded thereon.

U.S. Pat. No. 7,189,043 to Benoit et al., entitled "Tethered Retainer Assembly", describes a retainer for holding nuts, bolts and other components and included a pocket configured for retaining a portion of the component and having an entrance opening for insertion of the component in the pocket.

U.S. Publication No. 2007/0107174 to Bordas, entitled "Methods And Apparatus For Fastening Panels", describes an apparatus for coupling a panel to a frame that includes in part a support plate coupled to the panel, an engagement plate extending transversely from the support plate and having an aperture extending therethrough and a clip having a pivotable arm extending from the support plate.

U.S. Pat. No. 7,954,205 to Xueyong et al., entitled "Clip Retainer", describes a clip retainer which includes a top surface having a groove and a bottom surface which has stopping ribs and a barb formed between the stopping ribs.

U.S. Pat. No. 8,979,156 to Mally, entitled "Vehicle Panel Attachment Arrangement", describes a vehicle panel attachment arrangement including a vehicle panel, a clip supporting section, a first wall section and at least one resilient arm.

While the above existing fasteners disclose various vehicle panel attachment configurations, there remains a need for new approaches for attachment of a vehicle panel to a frame, to reduce, e.g., warranty claims for relatively loose panels and noise, vibration and harshness (NVH) issues that may arise with respect to vehicle occupants.

SUMMARY

In at least one embodiment, a fastening system to fasten a panel to a panel support structure is provided, with the fastening system comprising a first fastener fastened to the panel; a second fastener fastened to the first fastener, and fastenable to the panel support structure; the first fastener comprising a hollow housing; the hollow housing having a side-wall extending from the panel and a top-wall substantially transverse to the side-wall; a first aperture formed in the side-wall and in the top-wall of the hollow housing, the first aperture configured for entry of the second fastener during fastening of the second fastener and first fastener; a second aperture formed in the side-wall of the hollow housing; a beam formed in the side-wall between the first aperture and the second aperture, the beam attached at opposing ends to the side-wall; the beam blocking the first aperture to inhibit separation of the second fastener from the first fastener through the first aperture; and the beam configured to deform during fastening of the second fastener to the first fastener.

In at least one embodiment, the beam is configured to deform into the second aperture.

In at least one embodiment, the beam includes a retention member located between the opposing ends which blocks the first aperture to inhibit separation of the second fastener from the first fastener through the first aperture; the retention member is located in a medial region of the beam between opposing end regions; and the medial region has a cross-sectional area which is greater than a cross-sectional area of each of the end regions.

In at least one embodiment, the hollow housing forms a cavity; the second fastener has a longitudinal axis and a shoulder; the shoulder of the second fastener occupies the cavity of the hollow housing, and engages with the top-wall of the hollow housing to inhibit separation of the second fastener from the hollow housing along the longitudinal axis.

In at least one embodiment, the first aperture has an aperture shoulder region configured for entry of the shoulder of the second fastener into the cavity of the hollow housing during fastening of the second fastener and first fastener; and the retention member blocks the aperture shoulder region of the first aperture to inhibit separation of the second fastener from the first fastener through the first aperture.

In at least one embodiment, the second fastener has a head configured to fasten to the panel support structure, and a neck located between the head and the shoulder; and the first aperture has an aperture neck region, the aperture neck region has an aperture neck region seating portion and an aperture neck region entrance portion; the aperture neck region entrance portion configured for entry of the neck of the second fastener into the aperture neck region seating portion of the hollow housing during fastening of the second fastener and first fastener; and the neck of the second fastener occupies the aperture neck region seating portion.

In at least one embodiment, the aperture neck region entrance portion has a form of a channel which narrows as the channel extends towards a central axis of the first fastener.

In at least one embodiment, the neck of the second fastener has a diameter; the aperture neck region entrance portion has a width; and at least a portion of the width of the aperture neck region entrance portion is less than the diameter of the neck of the second fastener.

In at least one embodiment, the beam extends circumferentially around the hollow housing.

In at least one embodiment, the beam has a length extending circumferentially around the hollow housing, and the length is in a range of 5 mm to 10 mm.

In at least one embodiment, the beam has a length extending circumferentially around the hollow housing; and at least a portion of the length of the beam is defined by the first aperture and the second aperture.

In at least one embodiment, the beam has an overall length extending circumferentially around the hollow housing; and the overall length of the beam is defined by the first aperture and the second aperture.

In at least one embodiment, the first fastener and the second fastener are each formed of a thermoplastic composition.

In at least one embodiment, the hollow housing is formed as a monolithic structure with the panel.

In at least one embodiment, the hollow housing forms at least one of hollow tower and a doghouse.

In at least one embodiment, the second fastener is at least one of a push-pin fastener and a Christmas-tree fastener.

In at least one embodiment, the panel is a motor vehicle panel; and the panel support structure is a motor vehicle support structure.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1A:
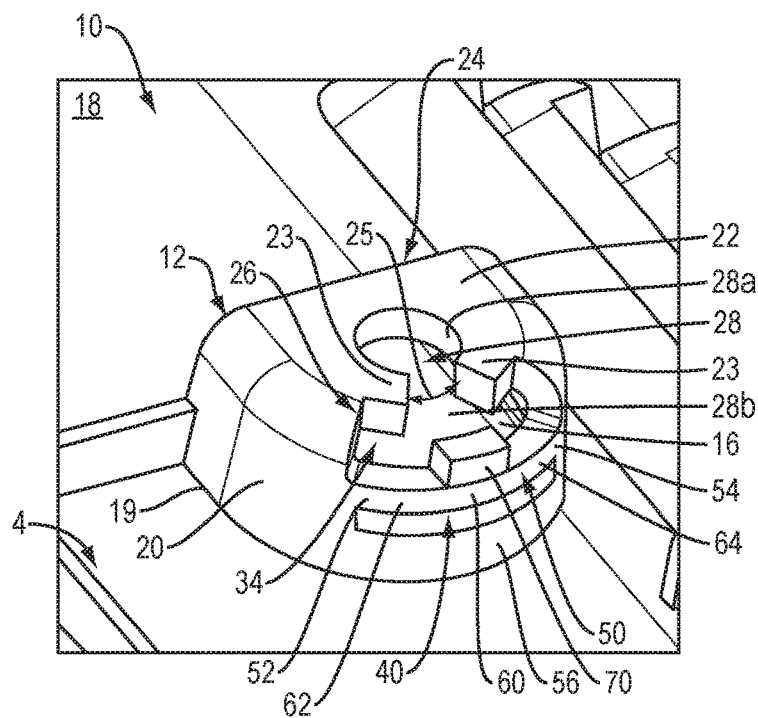
FIG. 1A is perspective view of a first fastener according to the present disclosure.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

With reference to the drawings, wherein like numerals indicate like structure, such illustrate a fastening system 2 comprising a first fastener 10 and a second fastener 100 configured to mate to fasten and retain a panel to a panel support structure.

Figure 3:
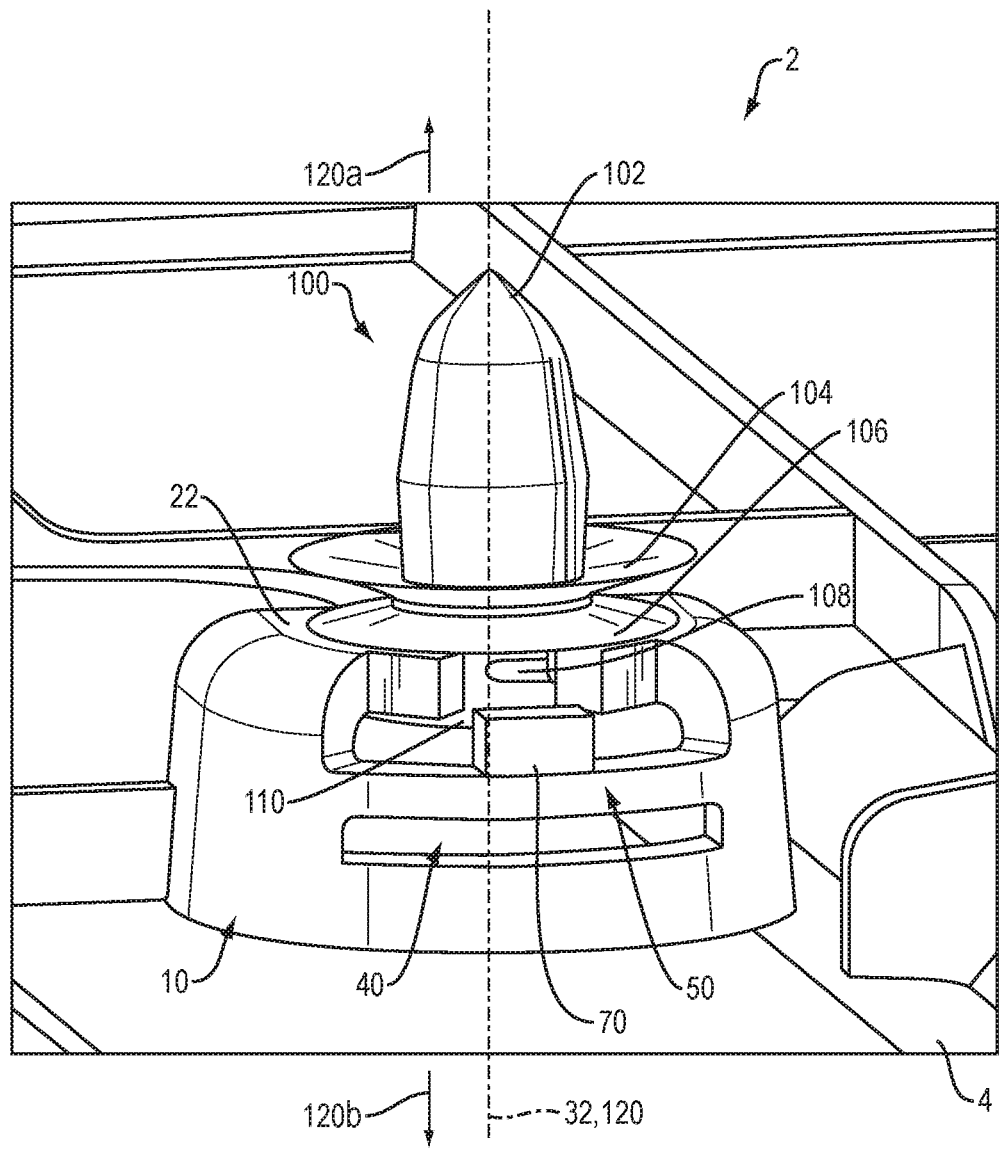
FIG. 3 is another perspective view of the first fastener of FIG. 1 fastened with the second fastener to provide the fastening system according to the present disclosure.

Briefly referring to FIG. 3, second fastener 100 includes a head 102, a circular flange 104, a circular collar 106, a cylindrical shaft or neck 108, and a circular shoulder 110 disposed along a longitudinal axis 120. Shoulder 110 positively mechanically engages against a top-wall 22 of the first fastener 10 to inhibit separation of the first and second fasteners 10, 100 along the longitudinal axis 120 in a first direction 120*a*, while collar 106 positively mechanically engages against the top-wall 22 of the first fastener 10 to inhibit separation of the first and second fasteners 10, 100 along the longitudinal axis 120 in a second direction 120*b* opposite the first direction 120*a*. Second fastener 100 is preferably formed by injection molding, from a thermoplastic composition, such as polyoxymethylene (POM), also known as polyacetal. As shown, second fastener 100 may be understood to be a push-pin fastener, or a barbless christmas-tree fastener (so named by its contour).

Returning to FIG. 1, such illustrates, in perspective view, the first fastener 10 without the second fastener 100. As shown, first fastener 10 is disposed on a motor vehicle trim panel 4, particularly as part of the fastening system 2. The first fastener 10 as described herein is preferably formed by injection molding of a thermoplastic composition as a monolithic structure with the trim panel 4. The thermoplastic composition may include, e.g., polypropylene (PP) or acrylonitrile-butadiene-styrene (ABS), which may be blended with polycarbonate (PC) to provide an ABS/PC blend.

The first fastener 10 may be particularly configured to detachably retain mating second fastener 100, particularly by detachable positive mechanical engagement therewith. The second fastener 100 may be particularly configured to positively mechanically engage with and mechanically disengage from the first fastener 10, as well as a trim panel support structure of the motor vehicle, such as a body member. It will be appreciated by those skilled in the art that the panel 4 and the panel support structure may be employed in a number of automotive fastening applications. By way of example, and not by limitation, the panel 4 may be an interior trim panel, such as a door trim panel, and the support structure may be the door frame to which the panel 4 is to be fastened. The panel 4 may include a plurality of the first fasteners 10 which each respectively may positively mechanically engage and disengage with one of a corresponding plurality of the second fasteners 100.

As set forth above, the first fastener 10 may be monolithically formed as part of the panel 4, such as by injection molding of a thermoplastic material (e.g. PP, ABS, etc). Again, the second fastener 100 may take the form of a push-pin or barbless christmas-tree, having at least one deformable clip.

The first fastener 10 has a configuration of a hollow, three-dimensional housing 12. In such regards, the first fastener 10 has an internal cavity 16 which is defined by a bottom wall 18 (wall of the panel 4), a side-wall 20 extending from the bottom wall 18, e.g. substantially transverse (e.g. within 20 degrees of being transverse) thereto, and a top-wall 22, which is substantially transverse to the side-wall 20.

Side-wall 20 extends from a base 19 which is attached to the wall 18 of the panel 4. The side-wall 20 defines a front aperture 24, which also may be understood to be an opening, which permits access to the cavity 16, such that the cavity 16 may be cored during molding, typically with a moving slide as known in the art. In automotive or plastic molding terms, with the foregoing structure, the housing 12 may be generally referred to as a hollow tower or a doghouse.

Opposite front aperture 24, housing 12 includes a first rear aperture 26, which also may be understood to be an opening, which is defined by side-wall 20 and top-wall 22. Rear aperture 26 is configured to provide an assembly aperture through which the second fastener 100 travels in a first direction, substantially lateral (e.g. within 20 degrees of being lateral) to the longitudinal axis 120, when the second fastener 100 is in a process of being attached/mechanically engaged with the first fastener 10, and which is configured to provide an disassembly aperture through which the second fastener 100 travels in a second direction, substantially lateral to the longitudinal axis 120 and opposite the first direction, when the second fastener 100 is in a process of being detached/mechanically disengaged from the first fastener 10.

Aperture 26 includes an aperture neck region 28 and an aperture shoulder region 34. Aperture neck region 28 of aperture 26 is configured to provide an assembly aperture through which the neck 108 of the second fastener 100 travels in the first direction, substantially lateral (e.g. within 20 degrees of being lateral) to the longitudinal axis 120, when the neck 108 of the second fastener 100 is in a process of being attached/mechanically engaged with the first fastener 10, and which is configured to provide a disassembly aperture through which the neck 108 of the second fastener 100 travels in the second direction, substantially lateral to the longitudinal axis 120 and opposite the first direction, when the neck 108 of the second fastener 100 is in a process of being detached/mechanically disengaged from the first fastener 10.

As shown, aperture neck region 28 of aperture 26 includes an aperture neck region seating portion 28a and an aperture neck region entrance/exit portion 28b. Aperture neck region seating portion 28a is configured to contain neck 108 of the second fastener 100 when the second fastener 100 is seated with the first fastener 10. As shown, aperture neck region seating portion 28a is shown as a semi-circular aperture formed in the top-wall 22 of the housing 12. The aperture neck region seating portion 28a has a radius defined by a central axis 32 extending substantially transverse to the top-wall 22. The central axis 32 of the first fastener 10 corresponds with the longitudinal axis 120 of the second fastener 100 when the first fastener 10 and the second fastener 100 are fastened.

As shown, aperture neck region entrance/exit portion 28b is also formed in the top-wall 22 of the housing 12. Aperture neck region entrance/exit portion 28b provides an entrance to aperture neck region seating portion 28a, such that neck 108 of the second fastener 100 may travel through aperture neck region entrance/exit portion 28b and into aperture neck region seating portion 28a. As shown, the aperture neck region entrance/exit portion 28b is in the form of a channel which narrows or tapers, particularly conically, as the aperture neck region entrance/exit portion 28b extends towards the aperture neck region seating portion 28a, as well as the central axis 32. The aperture neck region entrance/exit portion 28b is defined by two opposing deformable, resilient arm portions, which also may be referred to as cantilevered tabs 23. The deformable tabs 23 narrow a width of the neck region entrance/exit portion 28b such that an interference fit is created when the neck 108 of second fastener 100 moves laterally through aperture neck region entrance/exit portion 28b to aperture neck region seating portion 28a.

The minimum width of the channel of aperture neck region entrance/exit portion 28b of aperture neck region 28 of aperture 26 may be 80-90% of the diameter of the neck 108 of the second fastener 100, to provide an interference fit. In the context of the present disclosure, it should be appreciated that the minimum width of the channel of aperture neck region entrance/exit portion 28b of aperture neck region 28 of aperture 26 may have a value in the range of 4.0 mm to 7.0 mm. Preferably, the neck 108 of the second fastener 100 may therefore have a diameter of 4.5 mm to 5.5 mm, more preferably 5.0 mm. When the neck 108 of the second fastener 100 has a diameter of 5.0 mm, the minimum width of the channel of aperture neck region entrance/exit portion 28b of aperture neck region 28 of aperture 26 preferably has a value of 4.2 mm.

Once the neck 108 of second fastener 100 is located in the aperture neck region seating portion 28a, tabs 23 act to retain the neck 108 of second fastener 100 in aperture neck region seating portion 28a and inhibit the neck 108 of second fastener 100 from being removed laterally from aperture neck region seating portion 28a, particularly given the distance between the tabs 23 at arrow 25 is less than the diameter of the neck 108 of second fastener 100.

Shoulder region 34 of aperture 26 is configured to provide an assembly aperture through which a shoulder 110 of second fastener 100 travels in the first direction substantially lateral (e.g. within 20 degrees of being lateral) to the longitudinal axis 120, when the shoulder 110 of the second fastener 100 is in a process of being attached/mechanically engaged with the first fastener 10, and which is configured to provide a disassembly aperture through which the shoulder 110 of the second fastener 100 travels in a second direction, substantially lateral to the longitudinal axis 120 and opposite the first direction, when the shoulder 110 of the second fastener 100 is in a process of being detached/mechanically disengaged from the first fastener 10.

As shown, housing 12 includes a second rear aperture 40, which has the form of a slot, and which also may be understood to be an opening, formed in side-wall 20 which is peripherally aligned with and disposed beneath the first rear aperture 26, i.e. located between the first rear aperture 26 and the base 19 of the housing 12 adjoining wall 18 of the panel 4. As shown, both the first rear aperture 26 and second rear aperture 40 are isolated from one another. Also as shown, second rear aperture 40 has a peripheral (circumferential) length around the periphery of the semi-circular side-wall 20 (transverse to the central axis 32) which is substantially equal to a peripheral (circumferential) length of the shoulder region 34 of the first aperture 26 around the periphery of the semi-circular side-wall 20. Second rear aperture 40 has a height that is in the range of 1.5 mm to 4.0 mm, in 0.1 mm increments, and is preferably 2.5 mm.

With the formation of first rear aperture 26 and second rear aperture 40, a portion of the side-wall 20 forms a deformable, resilient beam 50 between the two apertures 26, 40. As shown, beam 50 is continuous along its peripheral (circumferential) length to adjoining portions of side-wall 20 (circumferential span). Stated another, opposing ends 52, 54 of the beam 50 are fixed to adjoining portions of side-wall 20. As such, beam 50 may be referred to as a fixed beam, i.e. a beam whose both ends are fixed, and not a cantilevered beam in which one end is fixed and the opposing end is free.

Also as shown, beam 50 may be understood to be an upper region of the side-wall 20 of the housing 12 relative to second rear aperture 26, while the region of the side-wall 20 beneath the rear aperture 26 may be understood to be a lower region 56 of the side-wall 20 of the housing 12.

Beam 50 has a medial region 60 disposed between two opposing lateral end regions 62, 64. Medial region 60 includes a raised portion 70 which serves as a retention member used to retain the second fastener 100 when inserted in and coupled to the first fastener 10. As such, the medial region 60 has a cross-sectional area (parallel to the central axis 32) which is greater than a cross-sectional area of each of the end regions 62, 64.

Figure 1B:
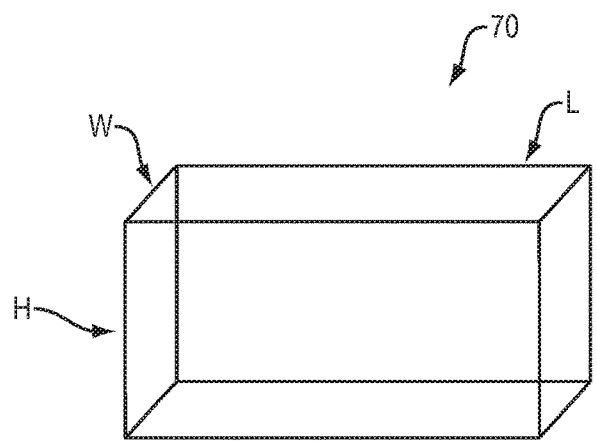
FIG. 1B is a close-up view of the retention member of FIG. 1A.

As shown, the retention member 70 is illustrated as a rectangular type cuboid structure which is preferably of matching curved configuration to the underling structure of beam 50. The preferred and general rectangular cuboid type structure is shown in FIG. 1B, without the indicated curvature shown in FIG. 1A, where the structure will preferably have a length L in the range of 5.0 mm to 10.0 mm, a width W in the range of 2.0 mm to 4.0 mm, preferably 2.0 mm to 2.5 mm, and a height H in the range of 1.5 mm to 4.0 mm, preferably 2.5 mm. It should also be noted that the width W refers to the preferred wall thickness of the side-wall 20 of fastener 10.

Figure 2:
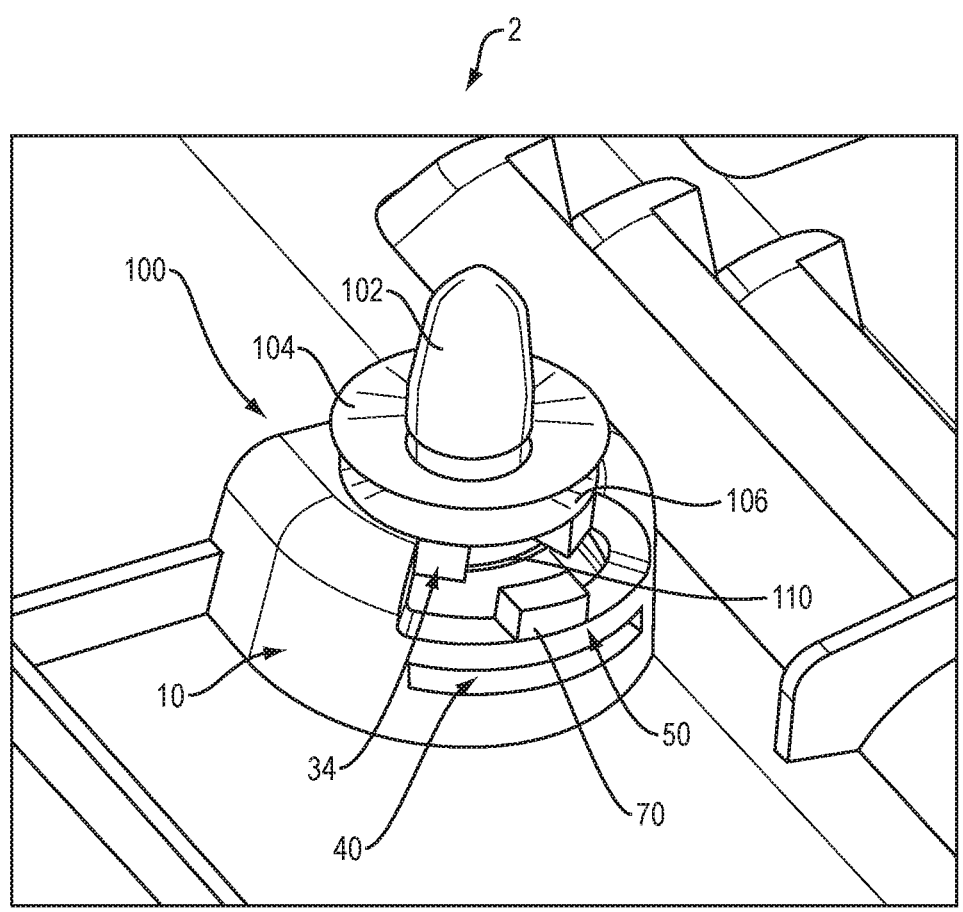
FIG. 2 is a perspective view of the first fastener of FIG. 1 fastened with a second fastener to provide a fastening system according to the present disclosure.

Attention is next directed to FIGS. 2-3, which illustrates the placement and engagement of the second fastener 100 with the first fastener 10. As may be appreciated, second fastener 100 may be assembled with first fastener 10 by placing an outer portion of shoulder 110 in overlying relationship over beam 50. Thereafter, second fastener 100 may be moved and slid laterally (relative to longitudinal axis 120) such that neck 108 of second fastener 100 enters aperture neck region entrance/exit portion 28*b* of aperture neck region 28 of aperture 26, while shoulder 110 of second fastener 100 similarly enters aperture shoulder region 34 of aperture 26. With continued lateral movement towards central axis 32 of the first fastener, neck 108 of second fastener 100 makes contact with deformable, resilient tabs 23 and forces them apart such that neck 108 may pass through aperture neck region entrance/exit portion 28*b* of aperture neck region 28 of aperture 26 and into aperture neck region seating portion 28*a* of aperture neck region 28 of aperture 26. Similarly, with the continued lateral movement towards central axis 32 of the first fastener 10, the shoulder 110 of second fastener 100 similarly passes through aperture shoulder region 34 of aperture 26 and into cavity 16.

During the foregoing insertion of second fastener 100 into the aperture 26 of first fastener 10, it may be necessary to elastically deform beam 50 of first fastener 10 in order for second fastener 100 to properly enter aperture 26. More particularly, beam 50 may be forced downward, and elastically deform into the space provided by second rear aperture 40, particularly by shoulder 110 of second fastener 100 moving downward along longitudinal axis 120 into contact with retention member 70. It should be noted that the beam 50 may be sufficiently deformable such that it may deflect up to its full height of second rear aperture 40, as noted above. In other words, with respect to the preferred embodiments described herein, beam 50 may deflect downwardly 2.5 mm due to the presence of the second rear aperture 40 which has a height of 2.5 mm.

Upon such elastic deformation of beam 50, aperture shoulder region 34 of aperture 26 may now be unobstructed/unoccluded by retention member 70 to the passing of shoulder 110 of second fastener 100 into aperture shoulder region 34 of aperture 26, which blocks aperture shoulder region 34 to lateral entry of shoulder 110 of second fastener 100.

Thereafter, after passage of shoulder 110 of second fastener 100 through aperture shoulder region 34 of aperture 26, beam 50 and retention member 70 may substantially elastically recover (e.g. greater than 80% recover), or fully elastically recover, to their pre-deformation position.

With the elastic recovery of tabs 23 and beam 50 upon assembly of second fastener 100 with first fastener 10, both tabs 23 and retention member 70 of beam 50 will restrict lateral disengagement of the second fastener 100 from the first fastener 10. In addition, the retention member 70 provides additional lateral restriction against disengagement of the second fastener 100 which may occur, e.g., during shipping to an assembly plant. Accordingly the first fastener 10 herein is now conveniently molded without any need to alter its size to ensure retention of the second fastener 100 which may otherwise add cost and mass, which of course are undesirable from a manufacturing perspective.

As may therefore now be appreciated, the structure disclosed herein provides an improved fastening system for attaching a panel to a support member or substrate, such as a door trim panel to the underlying support structure of the door. The fastening system is particularly configured to provide a convenient and relatively low cost solution to the problem of failure of the clip to remain in the fastener which retention feature can be molded directly into the fastener structure.

LISTING OF REFERENCE CHARACTERS 2 fastening system
4 trim panel
10 first fastener
12 hollow housing
16 internal cavity
18 bottom wall (wall of panel)
19 base of housing
20 side-wall of housing
22 top-wall of housing
23 top-wall tabs
24 front aperture
25 arrow
26 first rear aperture
28 aperture neck region
28*a* aperture neck region seating portion
28*b* aperture neck region entrance/exit portion
32 central axis
34 aperture shoulder region
40 second rear aperture
50 beam (upper region of side-wall)
52 beam end
54 beam end
56 lower region of side-wall
60 beam medial region
62 beam end region
64 beam end region
70 retention member
100 second fastener
102 second fastener head
104 second fastener flange
106 second fastener collar
108 second fastener neck
110 second fastener shoulder
120 second fastener longitudinal axis
120*a* first longitudinal direction
120*b* second longitudinal direction
L length of retention member
W width of retention member
H height of retention member

What is claimed is:

1. A fastening system to fasten a panel to a panel support structure, the fastening system comprising:
   a first fastener fastened to the panel;
   a second fastener fastened to the first fastener, and fastenable to the panel support structure;
   the first fastener comprising a hollow housing;
   the hollow housing having a side-wall extending from the panel and a top-wall substantially transverse to the side-wall;
   the side-wall having an inner side facing an internal cavity of the hollow housing, an outer side facing opposite the inner side and a wall thickness extending from the inner side to the outer side;
   a first aperture formed in the side-wall and in the top-wall of the hollow housing, the first aperture configured for entry of the second fastener during fastening of the second fastener and first fastener;

a second aperture formed in the side-wall of the hollow housing;

a beam formed in the side-wall between the first aperture and the second aperture, the beam formed by the wall thickness of the side-wall and attached at opposing ends to the side-wall;

the beam blocking the first aperture to inhibit separation of the second fastener from the first fastener through the first aperture; and the beam configured to deform during fastening of the second fastener to the first fastener.

2. The fastening system of claim 1 wherein:
the beam is configured to deform into the second aperture.

3. The fastening system of claim 1 wherein:
the beam includes a retention member located between the opposing ends which blocks the first aperture to inhibit separation of the second fastener from the first fastener through the first aperture;
the retention member is located in a medial region of the beam between opposing end regions; and
the medial region has a cross-sectional area which is greater than a cross-sectional area of each of the end regions.

4. The fastening system of claim 1 wherein:
the hollow housing forms a cavity;
the second fastener has a longitudinal axis and a shoulder;
the shoulder of the second fastener occupies the cavity of the hollow housing, and engages with the top-wall of the hollow housing to inhibit separation of the second fastener from the hollow housing along the longitudinal axis.

5. The fastening system of claim 4 wherein:
the first aperture has an aperture shoulder region configured for entry of the shoulder of the second fastener into the cavity of the hollow housing during fastening of the second fastener and first fastener; and
the retention member blocks the aperture shoulder region of the first aperture to inhibit separation of the second fastener from the first fastener through the first aperture.

6. The fastening system of claim 4 wherein:
the second fastener has a head configured to fasten to the panel support structure, and a neck located between the head and the shoulder; and
the first aperture has an aperture neck region, the aperture neck region has an aperture neck region seating portion and an aperture neck region entrance portion;
the aperture neck region entrance portion configured for entry of the neck of the second fastener into the aperture neck region seating portion of the hollow housing during fastening of the second fastener and first fastener; and
the neck of the second fastener occupies the aperture neck region seating portion.

7. The fastening system of claim 6 wherein:
the aperture neck region entrance portion has a form of a channel which narrows as the channel extends towards a central axis of the first fastener.

8. The fastening system of claim 6 wherein:
the neck of the second fastener has a diameter;
the aperture neck region entrance portion has a width; and
at least a portion of the width of the aperture neck region entrance portion is less than the diameter of the neck of the second fastener.

9. The fastening system of claim 1 wherein:
the beam extends circumferentially around the hollow housing.

10. The fastening system of claim 9 wherein:
the beam has a length extending circumferentially around the hollow housing, and
the length is in a range of 5 mm to 10 mm.

11. The fastening system of claim 9 wherein:
the beam has a length extending circumferentially around the hollow housing; and
at least a portion of the length of the beam is defined by the first aperture and the second aperture.

12. The fastening system of claim 9 wherein:
the beam has an overall length extending circumferentially around the hollow housing; and
the overall length of the beam is defined by the first aperture and the second aperture.

13. The fastening system of claim 1 wherein:
the first fastener and the second fastener are each formed of a thermoplastic composition.

14. The fastening system of claim 1 wherein:
the hollow housing is formed as a monolithic structure with the panel.

15. The fastening system of claim 1 wherein:
the hollow housing forms at least one of hollow tower and a doghouse.

16. The fastening system of claim 1 wherein:
the second fastener is at least one of a push-pin fastener and a Christmas-tree fastener.

17. The fastening system of claim 1 wherein:
the panel is a motor vehicle panel; and
the panel support structure is a motor vehicle support structure.

* * * * *